United States Patent [19]

Doxsee et al.

[11] Patent Number: 4,866,107

[45] Date of Patent: Sep. 12, 1989

[54] ACRYLIC CONTAINING FRICTION MATERIALS

[75] Inventors: Leigh T. Doxsee, Morristown, N.J.; Robert E. Evans, Huntington; Michael P. O'Toole, Stamford, both of Conn.

[73] Assignee: American Cyanamid Company, Stamford, Conn.

[21] Appl. No.: 225,673

[22] Filed: Jul. 26, 1988

Related U.S. Application Data

[63] Continuation-in-part of Ser. No. 95,490, Sep. 11, 1987, abandoned, which is a continuation of Ser. No. 917,946, Oct. 14, 1986, abandoned.

[51] Int. Cl.$^4$ ............................................. C08J 5/14
[52] U.S. Cl. .................................. 523/153; 523/155; 523/156; 523/157; 523/158
[58] Field of Search ............... 523/153, 155, 156, 157, 523/158

[56] References Cited

U.S. PATENT DOCUMENTS

| | | | |
|---|---|---|---|
| 4,373,038 | 2/1983 | Moraw et al. | 523/156 |
| 4,374,211 | 2/1983 | Gallagher et al. | 523/155 |
| 4,418,115 | 11/1983 | LeLannou | 523/156 |
| 4,508,855 | 4/1985 | Peters | 523/155 |
| 4,543,377 | 9/1985 | Crossman | 523/207 |
| 4,656,203 | 4/1987 | Parker | 523/155 |
| 4,659,754 | 4/1987 | Edwards et al. | 523/214 |

*Primary Examiner*—Lewis T. Jacobs
*Attorney, Agent, or Firm*—Frank M. Van Riet

[57] ABSTRACT

The addition of fibrillated acrylic fiber to non-asbestos type friction material compositions provides marked improvement in the flexural strength, stiffness and structural integrity of preforms used in the manufacture of friction elements. The consequent handling characteristics of the preform provide improvement in the manufacturing of the friction element.

22 Claims, No Drawings

ACRYLIC CONTAINING FRICTION MATERIALS

CROSS-REFERENCE TO RELATED APPLICATIONS

This application is a continuation-in-part of application Ser. No. 07/095,490 filed Sept. 11, 1987 which is a continuation of application Ser. No. 06/917,946, filed Oct. 14, 1986 both abandoned.

BACKGROUND OF THE INVENTION

This invention relates to the incorporation of a fibrillated acrylic polymer pulp fiber into non-asbestos type friction materials for the purpose of improving the structural integrity of preforms. The preforms serve as intermediate products in the manufacture of friction elements.

It has become desirable to find a replacement for asbestos containing friction materials because of the health and safety hazards attributed to asbestos. Numerous approaches to the replacement of asbestos have led to a substantial body of technology that has resulted in at least three major categories of non-asbestos type formulations. The are: (1) semi-metallic materials, (2) organic non-asbestos materials, and (3) cold molding hydrocarbon materials. Such categories are generally illustrated by U.S. Pat. Nos. 3,856,120; 4,137,214 and 4,125,496, respectively. Other typical non-asbestos formulations are included in U.S. Pat. Nos. 4,278,584; 4,226,758; 4,226,759; and 4,219,452, all of which patents are hereby incorporated herein by reference.

The elimination of asbestos from friction material formulations has, however, created a substantial manufacturing problem. The problem is that the non-asbestos containing preforms, normally pressure formed at ambient temperatures prior to hot pressing and heat curing, generally do not possess acceptable structural integrity so as to enable them to withstand subsequent handling and storage without breakage. On the other hand, asbestos-containing compositions possess the requisite structural integrity to withstand such handling.

Attempts to substitute natural and synthetic fibers for asbestos fibers in the manufacture of friction materials are also exemplified by the following publications: U.S. Pat. No. 4,145,223 wherein the incorporation of glass fibers, steel fibers, organic synthetic fibers such as of phenolic resins and ceramic fibers is disclosed; U.K. Published Application No. 2027724 A wherein preoxidized acrylic fibers are taught; U.S. Pat. No. 4,197,223 and U.K. Pat. No. 1604827 wherein mixtures of inorganic and organic fibers such as glass fibers, mineral wools, alumino-silicate fibers, wood pulp, jute, sisal or cotton linters fibers are taught; U.S. Pat. Nos. 4,374,211 and 4,384,640 which teach aramid polymers; U.S. Pat. Nos. 4,418,115; 4,508,855; 4,539,240; 4,656,203; G.B. Published Application No. 2129006A; Japanese Published Application 87/106133; Japanese Published Application 87/89784; and Japanese Published Application 87/149908, all of which teach various acrylic polymer fiber incorporation, and all of which are also incorporated herein by reference.

All of these references fail, however, to recognize the critical correlation between fiber length and Canadian Standard Freeness (CSF) of the acrylic fiber which forms the crux of the inventive concept set forth herein. This invention solves the structural integrity problem encountered in non-asbestos preforms with the expedient of incorporating an effective amount of a fibrillated acrylic fiber having a unique fiber length/CSF correlation into the friction material to ensure the attainment of sufficient structural integrity to withstand the subsequent handling and/or storage of the preform prior to further processing.

SUMMARY OF THE INVENTION

The invention generally pertains to a non-asbestos type friction material composition, such as semi-metallic, organic non-asbestos or hydrocarbon cold forming types. The inventive composition is suitable for use in forming a friction element and is comprised of a thermosetting binder, a fibrous reinforcing material and an effective amount of a fibrillated acrylic polymer fiber, which composition results in good structural integrity of preforms subsequently made therefrom. Upon forming a mixture of the friction material composition of the invention, a friction element may be manufactured by following the usual steps of compressing the mixture to form a preform, pressing the preform at elevated temperatures, treating said pressed material at a temperature sufficient to effect curing and then forming a friction element, such as disc brakes, friction pads, clutch linings and the like from the cured material.

DETAILED DESCRIPTION OF THE INVENTION

It has been discovered that non-asbestos type friction material preforms can be substantially improved by the incorporation of relatively small amounts of fibrillated acrylic polymer fibers into the friction material provided that the Efficiency Index, as defined below, of the fibers ranges from about 0.8 to about 2.0. Acrylic pulp fibers per se are well known, as evidenced by the above-cited prior art, and may be typically included in preforms in amounts ranging from an effective amount, such as to result in good structural integrity of the preform, to about 15%, by weight, based on the total weight of all the ingredients. No particular advantage is seen in exceeding the 15% level due to economic considerations. It is preferred to utilize from about 0.5% to 10%, by weight, same basis, as such amounts are usually adequate for insuring the attainment of good structural integrity of the preform and serve to optimize the flexural strength.

The "Efficiency Index" of the fibrillated acrylic fibers, as used herein, is defined as the square root of the maximum fiber length times the average fiber length divided by the Canadian Standard Freeness times 1000 i.e., $$\sqrt{\frac{L\ max. \times L\ ave.}{CSF}} \times 10^3 = \text{Efficiency Index}$$

wherein L is the fiber length and CSF is the Canadian Standard Freeness.

It has been unexpectedly found that when the Efficiency Index is within the above defined limits, the article produced therefrom is equal to or greater than most commercially available friction materials as expressed by the measured breaking load and stiffness thereof.

Pulp fibers useful in the instant invention are fibrillated acrylic fiber wherein said fiber has a Canadian Standard Freeness (CSF) of from about 150 to about 350, preferably from about 175 to about 325. The fibrillated fiber length must range from about 0.15 in. to about 0.45 in. preferably from about 0.2 in. to about 0.4 in.

Preferred fibers are fibers having an acrylonitrile content of at least 85% (based on weight of acrylonitrile monomer content to total monomer content of the prepolymerization mixture). Particularly useful fibers have an acrylonitrile content in excess of about 89% and more preferably, between 89 and 91.5%, same basis. The preferred comonomer comprises methyl methacrylate which is preferably present at levels of at least about 8.5%, by weight, as discussed above.

An even more preferred fibrillated fiber is that produced from a random bicomponent fiber made from a 50/50 mixture of a 90/10 acrylonitrile/methyl methacrylate copolymer and a 93/7 acrylonitrile/methyl methacrylate copolymer. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation, see U.S. Pat. No. 3,047,455 hereby incorporated herein by reference.

Canadian Standard Freeness is measured as is described in a test set forth in an article entitled "Freeness of Pulp"; Tentative Standard 1943; Official Standard 1946; Revised 1958 and Official Test Method 1985; prepared by The technical committee of the Tappi Association. Without wishing to be bound by the theory, it is believed that fibers useful in producing the fibrillated fibers useful in the instant invention are those wherein the comonomer mix provides a fiber having lateral weakness and longitudinal strength. For acrylonitrile-based fibers, the fibrillated fiber precursor may be made by conventional wet-spinning, dry-spinning or melt-spinning methods. In the best mode contemplated at the time of the filing of this application; wet-spun, gel, hot-stretched and uncollapsed acrylonitrile-based fibers are employed in their fibrillated form.

The fibrillated acrylonitrile fibers useful in the instant invention can be made in any known manner such as by using a modified commercial blender. In general, modified Waring brand commercial blenders wherein the as supplied blade has been modified to provide a break edge of about 0.25 mm on the working edge, may be used. In operation, a relatively dilute slurry or precursor fiber in water is generally introduced into the blender device which is then run for at least about one-half hour to at least about one hour depending upon the molecular weight of the fiber being used. With acrylonitrile fiber having what is considered a high molecular weight, i.e., ca. 58,000, a process time as short as one-half hour is adequate while with a fiber of what is considered a low molecular weight, i.e., ca. 48,000, a minimum of about an hour is usually required. For the instant invention, the exact time of processing is not critical and will vary with the character and make-up of the precursor, i.e., molecular weight and monomer content and will be easily determined in view of this disclosure by simple experimentation. What has been found to be critical is control of the temperature of the slurry while it is being processed. In prior art techniques no attention was paid to the heat of the slurry mixture. Irrespective of the normal starting temperatures, i.e., room temperature, the mechanical action of the processing results in imparting heat energy to the slurry and slurry temperatures in excess of about 50° C. are experienced. Fibers produced thusly had CSF levels of about five-hundred to seven-hundred, and values of less than that were normally unable to be achieved prior to loss of useful properties as defined by these improved fibers. By providing means to maintain the temperature of the slurry in a lower range, excellent fibrillated fibers of desired CSF are obtained. In general, slurry temperatures maintained below about 40° C., produce useful fibers. It is contemplated that variation of the slurry temperature in and around 20°-40° C. using the aforedescribed technique alone or in combination with variations of slurry solids content will enable infinite variation of the critical parameters of CSF as may be required for the end use of the fibrillated fiber.

It is recognized that use of the commercial blender as described above is somewhat limited with regard to the amount of the fiber which can be produced in any one batch. However, larger amounts of the material can be produced using larger equipment. Ofttimes conventional cutting and beating devices do not produce the required fiber properties. However, when a Daymax brand, 10 gallon mixer, for example, is modified as per the modification on the smaller Waring device (i.e., ~0.25 break edge modification), 0.7% slurries of precursor maintained below 30° C. and processed for about four hours produce excellent fibrillated fiber for use in the present invention.

Additionally, beaters, such as those known in the art, incorporating shaped beater tubs and rotating, cylindrical, bladed beater rolls that both treat the fibers in cooperation with a stationary bed plate and cause the fiber slurry to flow continually around an oblong channel created by a central midfeather in the tub, may be used. The beater roll mounts replaceable blades in longitudinally oriented slots analogous in appearance to the stern wheel of a riverboat. The stock (e.g., 4% slurry) flows into the spaces between the blades and is thrown outward at a higher elevation section. Due to the sloping floor of the tub, the slurry circulates repeatedly while fibers, which are caught on the edges of the blades, undergo physical deformation as they are swept across the stationary blade. Residence times of up to about 30 hours may be used The beater roll may be raised or lowered to adjust clearance and/or thrust of the roll blades with respect to the stationary blade. Such beaters are sold by Belort/Jones Co.

Caustic soda (NaOH) may be added to the fiber slurry to aid dispersion and fibrillation thereof, especially during the early stages of the fibrillation process. Sufficient caustic soda to adjust the pH of the slurry to about 7-12 may be used.

Optionally, the use of a dispersant during fibrillation, such as, for example, Aerosol* OT-75, as available from American Cyanamid Company, Wayne, N.J., or any similar such material may be added to facilitate the fibrillation. The exact blending parameters or the equipment employed, however, are not limiting with regard to the present invention and it is contemplated that such may be varied and modified with simple experimentation by one skilled in the art in view of this disclosure.

Three general types of non-asbestos type friction materials have evolved in the art. They are semi-metallic materials, organic non-asbestos materials and hydrocarbon cold forming materials. Each type can be effectively modified with the fibrillated acrylonitrile fibers discussed above in accordance with the present invention, as discussed above.

Semi-metallic systems typically include phenolic resins; carbonaceous particles, such as graphite or carbon particles; non-asbestos fibers, such as those of magnesium oxide, zircon, mullite and alumina; metal powders, such as those of iron, copper, brass and stainless steel; and other modifiers, such as elastomers and inorganic wear fillers. The steel, ceramic or carbon fibers of this type of system may be replaced, in whole or in part, by the fibrillated acrylonitrile fiber in accordance with the instant invention.

Semi-metallic systems typically may contain the following amounts of the above constituents:

| Ingredient | Wt. % |
|---|---|
| Phenolic Resin | 4–13 |
| Graphite or Carbon Particles | 14–15 |
| Fibers[1] | 0–25 |
| Ceramic Powders[2] | 2–10 |
| Metal Powders[3] | 14–15 |
| Other Modifiers[4] | 0–20 |

[1]steel, ceramic or carbon fibers
[2]magnesium oxide, zircon, mullite, alumina
[3]iron, copper, brass, stainless steel
[4]elastomers, inorganic wear fillers.

In the manufacture of friction elements, the semi-metallic friction material constituents are mixed together to form a homogeneous mixture. The mixture is then pressed into a preform. The preform is then transferred to a second press where pressure and heat are simultaneously applied, causing the resin to melt and flow throughout the piece forming a continuous matrix for holding the other ingredients. The lining pad is then transferred to curing ovens and cured at temperatures ranging from 300° to 600° F. to further set the resins.

Organic non-asbestos systems typically include a thermosetting resin; cashew particles; non-asbestos fibers; and more than 20%, by weight, of a powdered inorganic compound having a MOH's hardness rating of greater than 2 and less than 5 and capable of being subjected to temperatures of greater than about 425° C. without substantial chemical or physical alteration. Such components are described in greater detail in U.S. Pat. No. 4,137,214 which patent is hereby incorporated by reference herein for the purpose of such additional description. Organic non-asbestos systems typically may contain the following amount of the above ingredients:

| Ingredient | Wt. % |
|---|---|
| Thermosetting Resin | 10–30 |
| Cashew Nut Particles | 5–25 |
| Non-Asbestos Fibers | 5–15 |
| Inorganic Compound | 20–60 |

Another so-called organic non-asbestos friction material is disclosed in U.S. Pat. No. 4,278,584. This patent discloses the following general formulation:

| Ingredient | Wt. % |
|---|---|
| Phenol-formaldehyde Resin | 6–12 |
| Carbon Fibers | 10–40 |
| Steel Fibers | 30–60 |
| Inorganic and/or Organic Fillers | 10–20 |

Again, the fibers of such systems may be replaced, in whole or in part, by fibrillated acrylonitrile fibers in accordance herewith.

Friction elements may be typically manufactured from organic non-asbestos mixtures by placing a quantity of the mixture in a mold and pressing at 1200 psi with a 10 second swell time in the mold to form a preform and then curing the preform at 300° F. for 15 minutes at 4000 psi with degassing at the end of one and 2.5 minutes. The edges of the cured preform are then trimmed to remove excess material and the preform post-baked while under constraint in a forming container to prevent swelling, for a period of 8 hours. The temperature is increased over a period of 1.5 hours to 400° F. and then held at that point for the remaining period.

Hydrocarbon cold forming friction materials of the non-asbestos type may typically include at least two systems. The first system includes non-asbestos inorganic fibers, cellulose fibers, optionally, carbon and/or graphite particles and a thermosetting organic binder comprising a hydroxyl terminated butadiene copolymer of the formula:

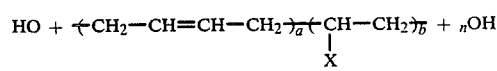

wherein X is phenyl or CN, a has a value of from 0.05 to 0.95, b has a value of from 0.005 to 0.5, and n is an integer from about 10 to 140, the binder having been cured with from about 0.1 to about 5 percent of a peroxide catalyst.

A second non-asbestos hydrocarbon cold-forming system includes metallic materials, graphite particles bonded together with a thermosetting hydroxyl butadiene copolymer of the formula:

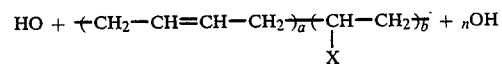

wherein X is phenyl or CN, a has a value of from 0.5 to 0.95, b has a value of from 0.005 to 0.5, and n is an integer from about 10 to about 140, the copolymer having been cured with from about 0.02 to about 12.5 percent of a peroxide catalyst.

The components mentioned above for both systems are discussed in greater detail in U.S. Pat. No. 4,125,496 which patent is hereby incorporated by reference for the purpose of such additional description.

The above mentioned hydrocarbon cold-forming systems typically may contain the following amounts of the above constituents:

| First System Ingredient | Wt. % |
|---|---|
| Inorganic Fibers | 20–70 |
| Cellulose Fibers | 5–25 |
| Coke Particles | 0–15 |
| Graphite Particles | 0–10 |
| Carbon Black | 0–15 |
| Thermosetting Organic Binder | 10–60 |

| Second System Ingredient | Wt. % |
|---|---|
| Metallic Material[1] | 15–75 |
| Graphite Particles | 5–20 |

| -continued | |
|---|---|
| Thermosetting Organic Binder | 2-50 |

(1)Metal fibers, metal powder or admixtures

In accordance with the present invention, the fibrillated acrylonitrile fiber may replace, in whole or in part, the fibers of these cold-forming systems.

In the manufacture of friction elements, hydrocarbon cold molding formulations are typically uniformly mixed and then cold molded at pressures on the order of 2000 to 5000 psi to form a preform. Curing of the preform can be accomplished by heating at elevated temperatures on the order of about 350° to 600° F. for a period of several hours.

The composition produced from these formulations can be formed into preforms at a pressure of about 1500 psi at ambient temperature. A percentage of the fibrillated acrylonitrile fiber may be combined with other fibers, such as, for example, aramid polymer fiber or pulp, such as, for example, Kevlar ® brand fiber or pulp or for that matter, Kevlar ® 29 brand, Kevlar ® 49 brand or Nomex ® brand fiber commercially available from DuPont de Nemours, Wilmington, Del.

Addition of the fibrillated acrylonitrile fiber enhances the breaking load of the preform. Additionally, the fibers are effective to improve the structural integrity of the preform in the amounts above set forth. The lower amounts ensure that adequate breaking load improvement is obtained and the upper amounts optimize the strengthening effect. Generally, due to considerations of flexural strength, it is even more preferred that less than about 4.0 wt. % fibrillated acrylonitrile fiber be added to the formulation. A maximum of about 4 wt. % fiber achieves an acceptable trade-off between breaking load and processability.

In each of the examples below wherein a fibrillated acrylonitrile fiber is employed, the fiber is either Type 110-1 of American Cyanamid Company which is produced from a 50/50 blend of a 90/10 acrylonitrile/methyl methacrylate copolymer and a 93/7 acrylonitrile/methyl methacrylate copolymer, having a specific gravity of 1.17±0.05 and a Thermal Decomposition Temperature of 350° C. and the additional properties set forth below:

| Screen Fineness* | 50-80% (14 mesh) |
|---|---|
| Tensile Strength** | 6-20 lbs/in. |
| Moisture Content | 0-4% |
| Appearance - visual | fine, white pulp |

*measured on wet pulp
**based on 100 g/m² handsheet from wet pulp-dried or Type T-98 which is produced from a copolymer of acrylonitrile and methyl methacrylate (91.5/8.5).

The following examples are set forth for purposes of illustration only and are not to be construed as limitations on the present invention except as set forth in the appended claims. All parts and percentages are by weight unless otherwise specified. In each example, E.I. = Efficiency Index. The breaking load is determined using the 3-point bend test, 3"×3" specimens.

EXAMPLE A

PREPARATION OF BRAKE SHOE MIX

3000 Parts of Bakelite ® 7716 phenol/formaldehyde resin, 4000 parts of Asbury sea coal (carbon) and 11,000 parts of fine barium sulfate are added to a Littleford FM-130-D mixer and the material is blended for three minutes. The resultant product is identified as Brake Mix A.

EXAMPLE B

PREPARATION OF BRAKE SHOE MIX

16 Parts of phenol/formaldehyde resin, 4.7 parts of fiberglass, 6.5 parts of granular carbon, 38.8 parts of rubber, 34 parts of fine barium sulfate and vermiculite are added to a mixer as in Example A. The material is blended for four minutes, the resultant product being identified as Brake Mix B.

EXAMPLE 1 (Comparative)

474.1 Parts of Brake Mix A and 52.7 parts of fiberglass are added to a commercial Waring blender. The materials are mixed for 1 minute and 170 parts are removed and distributed evenly in a disc pad mold. The mold is then pressed at 2500 psi for 5 seconds in a Carver Model C Laboratory press. Three samples are prepared and are broken in a 3-point bend test using an Instron Model 1123 twenty-four later. The average results are set forth in Table I, below.

EXAMPLES 2-4

The procedure of Example 1 is again followed except that 13.2 parts of (2) fibrillated acrylonitrile fiber B (T-98), (3) fibrillated acrylonitrile fiber D (T-110-1) and (4) Kevlar ® 305 aramid fiber are added, individually, to equal parts of Brake Mix A. The results are set forth in Table I, below.

TABLE I

| Ex. | Fiber | CSF (ml) | Fiber Max. Length (in) | Fiber Ave. Length (in) | E.I. | Breaking Load (lb) | Stiffness (lbs/in.) |
|---|---|---|---|---|---|---|---|
| 1C | None | — | — | — | — | .64 ± .25 | 13.4 ± 8.7 |
| 2C | B | 442 | .29 | .11 | .40 | 1.48 ± .21 | 43.8 ± 17.2 |
| 3 | D | 305 | .36 | .20 | .88 | 2.27 ± .13 | 54.5 ± 21.2 |
| 4C | aramid | 425 | .36 | .20 | .63 | 2.03 ± .13 | 50.5 ± 8.0 |

C = Comparative

As can be readily appreciated the molded pads of Examples 1 and 2 did not approach the standard (Example 4) in breaking load or stiffness while the pad produced according to the instant invention (Example 3) surpassed the standard. The fiber of Example 2 possessed in Efficiency Index which is too low to be useful in brake pad production.

EXAMPLE 5 (Comparative)

323.8 Parts of Brake Mix B and 171.8 parts of barium sulfate are added to a commercial Waring Blender and mixed for one minute. 150 Parts are removed and formed into disc pads as in Example 1. The average results are set forth in Table II, below.

EXAMPLES 6-9

The procedure of Example 5 is followed except that 4.7 parts of (6) fibrillated acrylonitrile fiber A (T-98), (7) fiber B, above, (8) fiber D, above, and (9) Kevlar ® 305 aramid fiber are also added, individually, to the blender. The results are set forth in Table II, below.

TABLE II

| Ex. | Fiber | CSF (ml) | Fiber Max. Length (in) | Fiber Ave. Length (in) | E.I. | Breaking Load (lb) | Stiffness (lbs/in.) |
|---|---|---|---|---|---|---|---|
| 5C | None | — | — | — | — | .69 ± .33 | 6.1 ± 2.6 |
| 6C | A | 573 | .17 | .11 | .24 | 1.00 ± .08 | 8.6 ± 0.8 |
| 7C | B | 442 | .29 | .11 | .40 | 1.26 ± .05 | 10.7 ± 0.5 |
| 8 | D | 305 | .36 | .20 | .88 | 1.57 ± .10 | 15.9 ± 0.8 |
| 9C | aramid | 425 | .36 | .20 | .63 | 1.63 ± .13 | 17.8 ± 1.3 |

Again, the only acrylonitrile fibrillated fiber which approached the standard in breaking load and in stiffness is that having an Efficiency Index within the range specified herein as critical.

EXAMPLE 10-18

The procedure of Example 1 is again followed except that 7.5 parts of various fibrillated acrylonitrile fibers are added. Kevlar ® 305 aramid is again used as a standard. The results are set forth in Table III below.

TABLE III

| Ex. | Fiber | CSF (ml) | Fiber Max. Length (in) | Fiber Ave. Length (in) | E.I. | Breaking Load (lb) | Stiffness (lbs/in.) |
|---|---|---|---|---|---|---|---|
| 10C | — | — | — | — | — | .69 ± .33 | 6.1 ± 2.6 |
| 11C | A | 573 | .17 | .11 | .24 | 1.49 ± .30 | 11.5 ± 4.8 |
| 12C | B | 442 | .29 | .11 | .40 | 1.80 ± .06 | 16.2 ± 3.9 |
| 13C | C* | 235 | .18 | .08 | .51 | 1.62 ± .20 | 13.7 ± 2.1 |
| 14 | D | 305 | .36 | .20 | .88 | 2.34 ± .38 | 26.2 ± 6.0 |
| 15 | E | 260 | .28 | .26 | 1.04 | 2.01 ± .33 | 27.7 ± 4.9 |
| 16 | F | 177 | .24 | .15 | 1.07 | 2.18 ± .18 | 26.4 ± 3.7 |
| 17 | G | 248 | .35 | .26 | 1.22 | 2.11 ± .31 | 20.9 ± 2.9 |
| 18 | aramid | 425 | .36 | .20 | .63 | 2.15 ± .33 | 21.6 ± 4.2 |

Fibers D, E, F, and G, (T-110-1) with Efficiency Indexes within the critical range of the instant invention are seen to compare very well with the aramid standard.
*Fiber C is T-98.

EXAMPLES 19-22

Again following the procedure of Example 1 except that 7.5 parts of fibrillated acrylonitrile fibers C and D, above, are added to the blender and a pad is pressed in a Carver Model C Laboratory press at 1500 psi for 5 seconds. The results are set forth in Table IV, below.

TABLE IV

| Ex. | Fiber | CSF (ml) | Fiber Max. Length (in) | Fiber Ave. Length (in) | E.I. | Breaking Load (lb) | Stiffness (lbs/in.) |
|---|---|---|---|---|---|---|---|
| 19C | — | — | — | — | — | 0.67 ± .22 | 8.1 ± 2.9 |
| 20C | C | 235 | .18 | .08 | .51 | 1.55 ± .32 | 12.7 ± 7.0 |
| 21 | D | 305 | .36 | .20 | .88 | 1.70 ± .30 | 13.5 ± 3.3 |
| 22 | aramid | 425 | .36 | .20 | .63 | 1.64 ± .38 | 11.4 ± 3.4 |

Fiber D, which has an Efficiency Index within the critical range, compares will with the aramid standard.

EXAMPLES 23-37

Following the procedure of Example 1 except that 13.2 parts of various fibrillated fibers are added as in Examples 2-4. The results are set forth in Table V, below.

TABLE V

| Example | Fibrillated Fiber Type* | CSF | E.I. | Breaking Load (lb.) |
|---|---|---|---|---|
| 23 C | T-98 | 442 | .41 | 2.30 |
| 24 | T-98 | 358 | .83 | 3.63 |
| 25 | T-98 | 268 | .88 | 3.56 |
| 26 | T-110-1 | 305 | 1.00 | 3.98 |
| 27 | T-110-1 | 248 | .94 | 3.77 |
| 28 | T-110-1 | 215 | .91 | 4.66 |
| 29 C | T-98 | 700 | .47 | 1.64 |
| 30 C | T-98 | 573 | .40 | 1.54 |
| 31 C | T-98 | 235 | .51 | 2.28 |
| 32 C | None | — | — | 0.65 |
| 33 C | Aramid | — | .63 | 2.79 |

C = Comparative
* = vacuum dried at 100° several hours.

What is claimed is:

1. A non-asbestos friction material composition suitable for use as a friction element comprising a thermosetting binder, a fibrous reinforcing material and a structural integrity imparting amount of a fibrillated acrylonitrile polymer based fiber having an Efficiency Index of from about 0.8 to about 2.0.

2. The friction material of claim 1 wherein said fibrillated fiber has a Canadian Standard Freeness of from about 150 to about 350 and a fiber length of from about 0.15 to about 0.45 in.

3. The friction material of claim 2 wherein the acrylonitrile monomer contribution to said fibrillated fiber is at least 85%, by weight.

4. The friction material of claim 3 wherein a comonomer of said acrylonitrile polymer comprises methyl methacrylate.

5. The friction material of claim 3 wherein the acrylonitrile monomer contribution to said fibrillated fiber is at lease about 89%, by weight.

6. The friction material of claim 5 wherein a comonomer of said acrylonitrile polymer comprises methyl methacrylate.

7. The composition of claim 2 wherein said non-asbestos friction material is a member selected from the group consisting of semi-metallic material, organic non-asbestos material and hydrocarbon cold forming material.

8. The composition of claim 2 wherein said fibrillated fiber is included a structural integrity inparting in amount of up to about 15%, by weight, based upon the total weight of all ingredients.

9. The composition of claim 2 wherein said fibrillated fiber is included in an amount from about 0.5% to 10%, by weight, based upon the total weight of all ingredients.

10. The composition of claim 2 wherein said non-asbestos type friction material is semi-metallic material.

11. The composition of claim 10 wherein said semi-metallic material contains phenolic resin, carbonaceous particles, non-asbestos fibers, ceramic powders and metal powder.

12. The composition of claim 2 wherein said non-asbestos type friction material is an organic non-asbestos material.

13. The composition of claim 12 wherein said organic non-asbestos material contains a phenol formaldehyde resin, carbon fibers and steel fibers.

14. The composition of claim 2 wherein said non-asbestos type friction material is a hydrocarbon cold forming material.

15. A method of making a preform of a non-asbestos type friction material, comprising: forming a mixture of a thermosetting binder, fibrous reinforcing material and a structural integrity inparting amount of a fibrillated acrylonitrile polymer fiber having an Efficiency Index of from about 0.8 to about 2.0 and compressing said mixture to form a preform.

16. The method of claim 15 wherein said non-asbestos type friction material is a member selected from the group consisting of semi-metallic material, organic non-asbestos material and hydrocarbon cold forming material.

17. The method of claim 15 wherein said fibrillated acrylonitrile fiber is included in a structural integrity inparting amount up to about 15%, by weight, based upon the total weight of all other ingredients.

18. In a method of manufacturing a friction element which includes the steps of forming a mixture of a friction material composition, compressing said mixture to form a preform, curing said preform at an elevated temperature, and forming a friction element from said cured preform, wherein the improvement comprises including a structural integrity inparting amount of a fibrillated acrylonitrile fiber having an Efficiency Index of from about 0.8 to about 2.0.

19. The method of claim 18 wherein said compressing step is preformed at ambient temperature.

20. The method of claim 18 wherein said non-asbestos type friction material is a member selected from the group consisting of semi-metallic material, organic non-asbestos material and hydrocarbon cold forming material.

21. A composition according to claims 1, 2, 15, or wherein said fibrillated fiber is a bicomponent fiber.

22. A composition according to claims 1, 2, 15 or wherein said bicomponent fiber is a random bicomponent fiber.

* * * * *